United States Patent
Bailey et al.

(10) Patent No.: US 8,244,554 B2
(45) Date of Patent: Aug. 14, 2012

(54) SYSTEM, METHOD, AND APPARATUS FOR MANAGING PRICE INFORMATION WITH LOCKING MECHANISMS

(75) Inventors: Jolie I Bailey, Frisco, TX (US); Isaac G Councill, San Jose, CA (US); Shun Jiang, Beijing (CN); Kenneth M Johns, Riverview, FL (US); Steven Prather, Riverview, FL (US); James J Rhodes, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 12/629,698

(22) Filed: Dec. 2, 2009

(65) Prior Publication Data

US 2011/0131148 A1 Jun. 2, 2011

(51) Int. Cl.
*G06Q 99/00* (2006.01)
(52) U.S. Cl. ............ 705/1.1; 705/80; 705/400; 707/953
(58) Field of Classification Search .................. 705/1.1, 705/400
See application file for complete search history.

(56) References Cited

U.S. PATENT DOCUMENTS

| 7,315,844 B2 * | 1/2008 | Zhang et al. .................. 705/400 |
| 7,454,367 B2 | 11/2008 | Yu et al. |
| 8,036,957 B2 * | 10/2011 | Ettl et al. ......................... 705/28 |
| 8,069,054 B2 * | 11/2011 | Hahn-Carlson et al. ........ 705/1.1 |
| 2003/0110066 A1 | 6/2003 | Walser et al. |
| 2006/0136323 A1 * | 6/2006 | Barry et al. ..................... 705/37 |
| 2006/0235794 A1 * | 10/2006 | Albazz et al. ................... 705/40 |

OTHER PUBLICATIONS

"Accounting for IT", Dec. 26, 2005, Business Line, 3 pages.*

* cited by examiner

*Primary Examiner* — John W Hayes
*Assistant Examiner* — Freda A Nelson
(74) *Attorney, Agent, or Firm* — Jeffrey T. Holman

(57) ABSTRACT

A computer-implemented method for managing price information. Embodiments include receiving a mapping of interconnected components, identifying as a first subset components subject to a first fixed price agreement not subject to a second fixed price agreement that overlaps the first fixed price agreement, identifying as a second subset the components subject to the second fixed price agreement not subject to the first fixed price agreement, and identifying as a third subset the components subject to both the first fixed price agreement and the second fixed price agreement. The method also includes receiving a price change for a price associated with a component in one of the subsets of components, and distributing an offset of the price change to components in the other subsets of components.

20 Claims, 6 Drawing Sheets

SYSTEM, METHOD, AND APPARATUS FOR MANAGING PRICE INFORMATION WITH LOCKING MECHANISMS

BACKGROUND

When generating prices for complex transactions, such as service engagements, there is often a need to price different portions of a deal in a different manner. This can become a complex requirement when there is a hierarchy within the pricing structure, which is often the case. For instance, an engagement specification may be created by defining specific components of a service to be delivered and then either drilling down to provide substructure within each component or assembling more complex structures by aggregating several disparate engagement components. This process results in a tree structure where the root node represents the entire engagement and subsequent levels in the tree represent engagement components of increasing granularity.

Each time a portion of the engagement deal is priced, a user may wish to maintain the assigned price over that specific portion even if other overlapping portions or subcomponents of the original portion are re-priced. When multiple, overlapping segments of the transaction require fixed prices, a change to a single component of the engagement may require changes to many other components to maintain all of the fixed price requirements. Determining these changes can be non-trivial in a complex transaction.

For example, if a vendor is entering into a deal that requires the company to sell equipment or services from multiple vendors, the markup on the equipment or services from one vendor may be different from those of another vendor. If a user prices hardware from one vendor, they may want to 'freeze' that price so it is not affected by other changes. Alternatively, a user might want to 'freeze' a parent price, price a child deal, and have the parent price remain intact. If a component price from the vendor is changed, that change may result in violation of one or more fixed price requirements.

Pricing a complex engagement deal can be a dynamic, collaborative process, and users may desire the ability to create freeze conditions of arbitrary scope and complexity. Maintaining these freeze conditions is a non-trivial problem as component prices change.

SUMMARY

Embodiments of a computer-implemented method for managing price information are described. In one embodiment, the computer-implemented method includes receiving a mapping of interconnected components, identifying as a first subset components subject to a first fixed price agreement not subject to a second fixed price agreement that overlaps the first fixed price agreement, identifying as a second subset the components subject to the second fixed price agreement not subject to the first fixed price agreement, and identifying as a third subset the components subject to both the first fixed price agreement and the second fixed price agreement. Each component represents a portion of a transaction proposal and includes an assignable associated price. The method also includes receiving a price change for a price associated with a component in one of the subsets of components, and distributing an offset of the price change to components in the other subsets of components. A total price associated with the first subset is the sum of prices associated with the first subset of components. A total price associated with the second subset is the sum of prices associated with the second subset of components. A total price associated with the third subset is the sum of prices associated with the third subset of components. The price of each fixed price agreement does not change and the total price of each subset of components is greater than or equal to zero. Other embodiments of the computer-implemented method are also described.

Embodiments of a computer program product for managing price information for components of a transaction proposal are described. The computer program product includes a computer useable storage medium to store a computer readable program that, when executed on a computer, causes the computer to perform operations, including receiving a mapping of interconnected components, identifying as a first subset components subject to a first fixed price agreement not subject to a second fixed price agreement that overlaps the first fixed price agreement, identifying as a second subset the components subject to the second fixed price agreement not subject to the first fixed price agreement, and identifying as a third subset the components subject to both the first fixed price agreement and the second fixed price agreement. Each component represents a portion of a transaction proposal and includes an assignable associated price. The method also includes receiving a price change for a price associated with a component in one of the subsets of components, and distributing an offset of the price change to components in the other subsets of components. A total price associated with the first subset is the sum of prices associated with the first subset of components. A total price associated with the second subset is the sum of prices associated with the second subset of components. A total price associated with the third subset is the sum of prices associated with the third subset of components. The price of each fixed price agreement does not change and the total price of each subset of components is greater than or equal to zero. Component price changes within a subset are linearly dependent upon the original associated price of the components. Other embodiments of the computer program product are also described.

Embodiments of a system are also described. In one embodiment, the system includes a price database, a price manager, and a user interface. The price database includes a mapping of interconnecting components. Each component represents a portion of a transaction proposal and includes an assignable associated price. A first group of components from the mapping is subject to a first fixed price agreement and a second group of components from the mapping is subject to a second fixed price agreement. The first group of components overlaps the second group of components. The price manager is configured to identify as a first subset the components in the first fixed price agreement not in the second fixed price agreement, identify as a second subset the components in the second fixed price agreement not in the first fixed price agreement, and identify as a third subset the components in both the first fixed price agreement and the second fixed price agreement. A total price associated with the first subset is the sum of prices associated with the first subset of components, a total price associated with the second subset is the sum of prices associated with the second subset of components, and a total price associated with the third subset is the sum of prices associated with the third subset of components. The price manager is further configured to receive a price change for a price associated with a component in one of the subsets of components and distribute an offset of the price change to components within the other subsets of components. The price of each fixed price agreement does not change, the total price of each component in the subsets of components is greater than or equal to zero, and component price changes within a subset are linearly dependent upon the original associated price of the components. The user interface is configured to generate a constraint region graph for the mapping. The constraint region graph includes one or more nodes and one or more edges, each node representing a homogeneously frozen region and each edge representing a frozen price constraint. The nodes are connected if a price change can be propagated from one connected node to another connected node. Other embodiments of the system are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
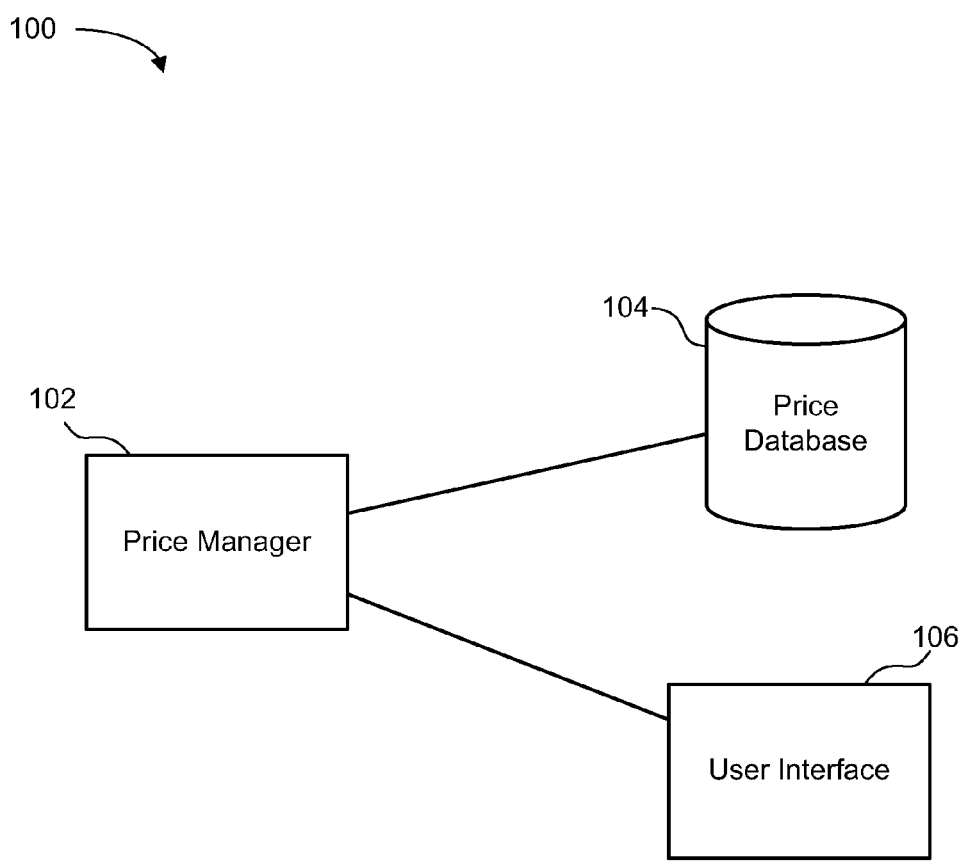
FIG. 1 depicts a schematic diagram of one embodiment of a system for managing price information for a transaction with locking mechanisms.

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

A complex transaction may include many components which are individually priced. Additionally, components or groups of components may be subject to fixed price agreements for business or technical reasons. Business or technical reasons may also cause changes to the price of one or more components in the transaction.

Users wishing to maintain fixed price agreements may find themselves unable to easily modify component prices without violating the fixed price agreements. Overlapping fixed price agreements percent particularly difficult challenges, and implementing a change to a component may require a non-trivial number of changes to other components in order to maintain the fixed price agreements.

Fixed price agreements result in a lock on components of the transaction. Two types of locks may be conceived: 1) a regular lock may be assigned such that the price of any component within a regularly locked portion of an transaction may not be changed, and 2) a price freeze may be assigned such that the price of any component within a frozen portion of the transaction may be changed, but the total price of the frozen portion must remain fixed. Regular locks need no special attention other than that they must be respected; however, the case of price freezes requires that price changes within a frozen region must be propagated to other components within the region in order to satisfy the freeze constraint. The best redistribution of price within a freeze will propagate a price change proportionally across all components with the additional constraint that no component of a deal may be negatively priced.

In one embodiment, a computer-implemented method analyzes the components of the transaction and determines a solution of price modifications to components that maintains fixed price agreements and minimizes the changes to individual component prices. In some embodiments, the method distributes price changes to regions of the transaction proportionally.

In one embodiment, the method is capable of dynamically maintaining a constraint region graph in response to user requests for the creation or removal of regular locks and freezes over arbitrary sets of components within a complex engagement specification. A lock management system is responsible for automatically identifying components that will be affected by a price change to an individual component or set of components as well as converting a price change into a system of linear equations that can be efficiently solved so as to propagate price changes within frozen regions in such a way as to minimize the least squared price change across affected components. Once the optimal solution is obtained in terms of homogeneously frozen regions, the lock management system propagates regional price changes to individual components within the regions proportionally in order to effect the per-component least squares solution.

FIG. 1 depicts a schematic diagram of one embodiment of a system 100 for managing price information for a transaction with locking mechanisms. The system 100 includes a price manager 102, a price database 104, and a user interface 106. The system 100 determines price modifications to components that maintain the fixed price agreements and minimizes the changes to component prices.

The price manager 102, in one embodiment, analyzes a system of prices for components in a transaction subject to one or more fixed price agreements. The price manager 102 accesses price data for components from the price database 104. The price manager 102 divides components in the transaction into regions based on the fixed price agreements and propagates price changes to the regions in a manner that minimizes changes to the regions.

In some embodiments, the price manager 102 generates a mathematical model that distributes price changes to the components proportionally based on their original price. In one embodiment, the price manager 102 uses a least-squares method to minimize changes to component prices.

In one embodiment, the price manager 102 operates on a computer system (not shown). For example, the price manager 102 may be a process operating on a server. In another embodiment, the price manager 102 operates on more than one computer system. The price manager 102 is described in greater detail in relation to FIG. 2.

The price database 104, in one embodiment, associates prices with components in the transaction. For example, a particular component in a transaction may have a price associated with the component. The price database 104 may operate on a computer system (not shown). The price database 104 communicates with the price manager 102. In one embodiment, the price database 104 operates on the same computer as the price manager 102. An alternative embodiment, the price database 104 operates on a separate computer from the price manager 102 and communicates with the price manager 102 over a network connection.

The user interface 106, in one embodiment, provides a method for interaction between a user and the price manager 102. The user interface 106 receives an input indicating a price change for a component or group of components, displays a graphical representation of components in the transaction, and displays an output indicating propagated changes generated by the price manager 102.

In some embodiments, the user interface 106 operates on a computer system (not shown). The user interface 106 may operate on the same computer system as the price manager 102 and communicate with the price manager 102 over an internal data bus (not shown). In an alternative embodiment, the user interface 106 may operate on a computer separate from the price manager 102 and communicate with the price manager 102 over a network connection. The user interface 106 is described in greater detail in relation to FIG. 3.

Figure 2:
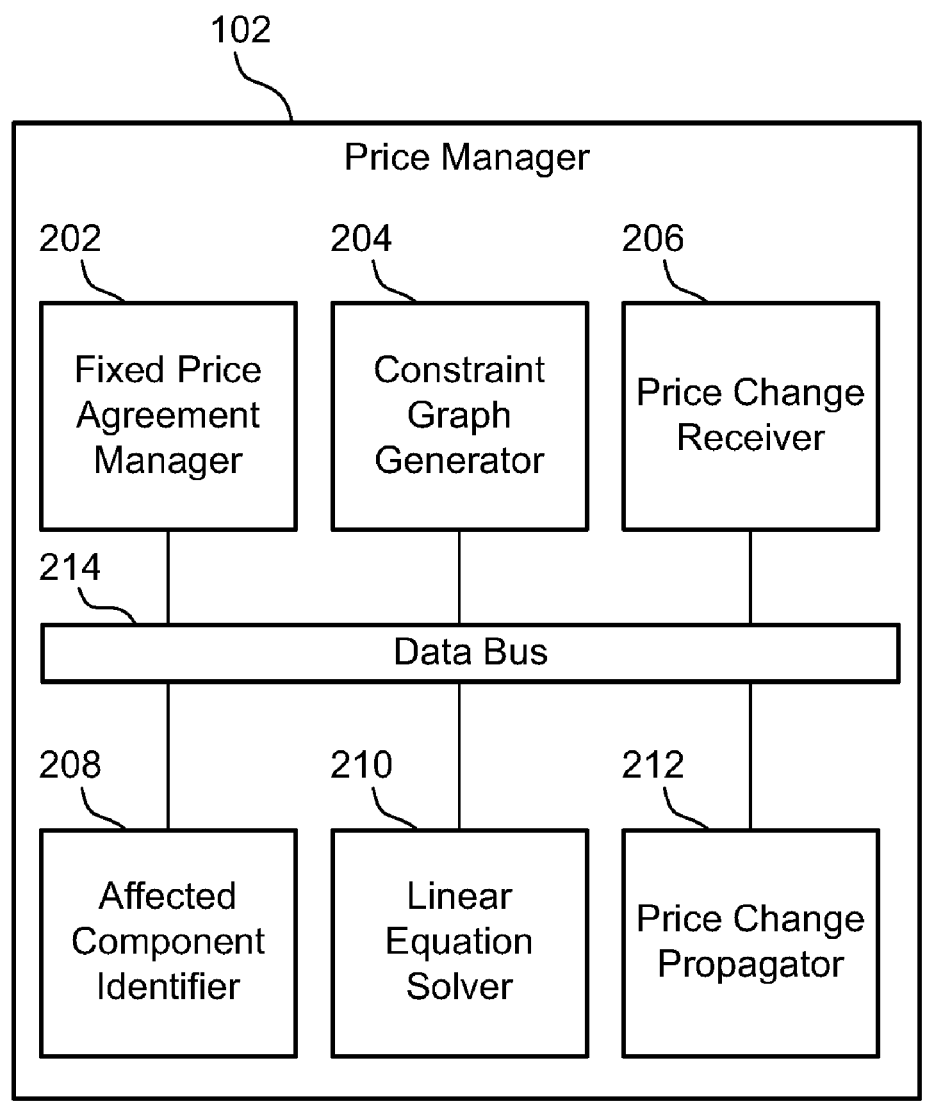
FIG. 2 depicts a schematic diagram of one embodiment of the price manager of FIG. 1.

FIG. 2 depicts a schematic diagram of one embodiment of the price manager 102 of FIG. 1. The price manager 102 includes a fixed price agreement manager 202, a constraint region graph generator 204, a price change receiver 206, an affected component identifier 208, a linear equation solver 210, a price change propagator 212, and a data bus 214. The price manager 102 propagates price changes to components of the transaction.

The fixed price agreement manager 202, in one embodiment, manages fixed prices for components or groups of components in a transaction. The fixed price agreement manager 202 indicates the total cost of a group of components should remain at a fixed price, even though individual prices of components in the group may change. For example, a group of components may have a fixed price, and a component in the group of components may increase in price. In this example, at least one other component in the group of components must decrease in price in order to maintain the fixed price of the group of components.

In some embodiments, the fixed price agreement manager 202 manages a plurality of fixed price agreements. The plurality of fixed price agreements may include two or more fixed price agreements that include components that overlap with one another. An example of a transaction having fixed price agreements that include overlapping components is illustrated in relation to FIGS. 4-7.

The constraint region graph generator 204, in one embodiment, generates a constraint region graph for the transaction that is a simplified representation of the transaction based on fixed price agreements. Each node in the constraint region graph represents a homogeneously frozen region of the transaction, and each edge represents a frozen price constraint. This graph is constructed such that regions are only connected within a graph component if it is possible to propagate price from one region to another. The constraint region graph generator 204 accesses the fixed price agreements managed by the fixed price agreement manager 202 in one embodiment. An example of a constraint region graph generated by the constraint region graph generator 204 is illustrated in relation to FIGS. 4-7.

In one embodiment, the price change receiver 206 receives a price change for a component of the transaction or a group of components of the transaction. The price change may be received by the price change receiver 206 as a result of an automated process for as a result of an input by a user. For example, the price change receiver 206 may receive a price change from the user interface 106. In another example, the price change receiver 206 may receive a price change as a result of an output from an automated process, such as a pricing engine.

The affected component identifier 208, in one embodiment, identifies components of a transaction that can be affected by the price change received by the price change receiver 206. Determining which components can be affected by the price change is dependent upon the relationship and overlap between fixed price agreements.

In one embodiment, the linear equation solver 210 generates and solves a set of linear equations to minimize the price change two components that satisfy the fixed price restrictions. Specific examples of implementations of the linear equations solver 210 are described in relation to FIGS. 4-8.

The price change propagator 212, in one embodiment, propagates price changes to components of the transaction. The price change propagator 212 may respond to the output of the linear equation solver 210 to determine price changes for individual components within the transaction. The price change propagator 212 may access the price database 204 and change prices within the price database 204.

The data bus 214 provides a communication pathway within the price manager 102 for various elements of the price manager 102. The data bus 214 may be any type of data communication system, including, but not limited to, a hardware bus, a wired connection, a network, a mesh system, and a wireless communication system. In some embodiments, the data bus 214 may include a combination of types of data communication system.

Figure 3:
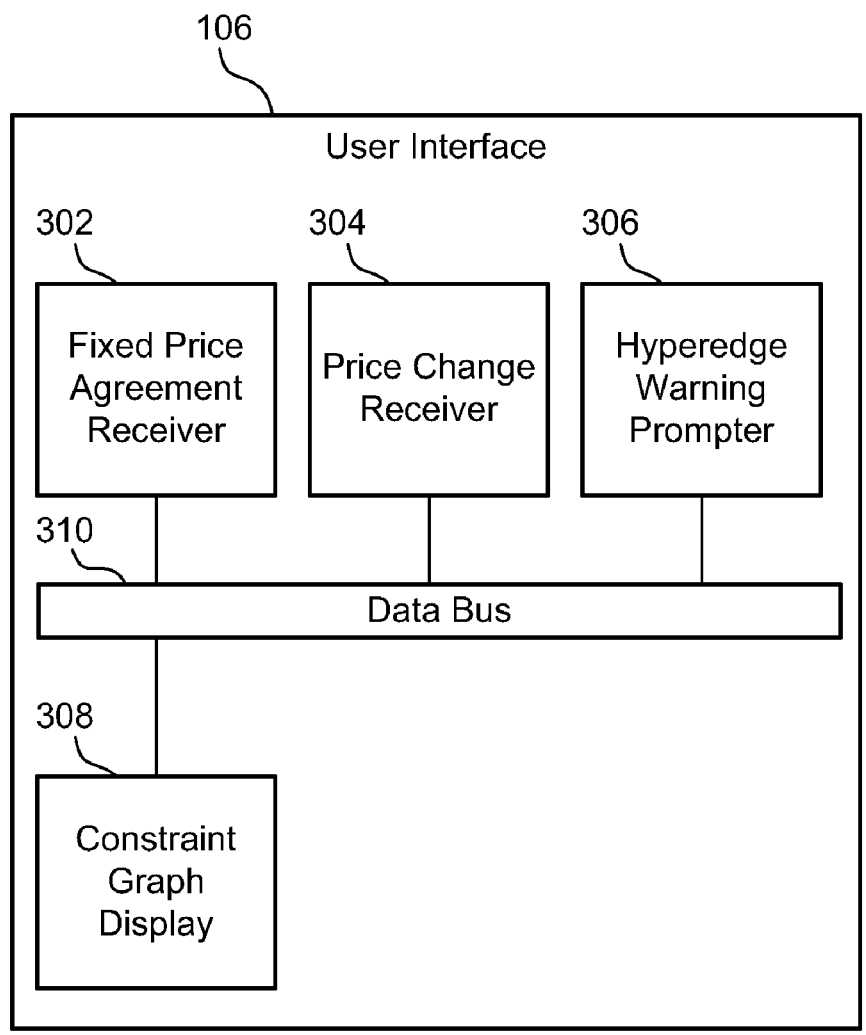
FIG. 3 depicts a schematic diagram of one embodiment of the user interface of FIG. 1.

FIG. 3 depicts a schematic diagram of one embodiment of the user interface 106 of FIG. 1. The user interface 106 includes a fixed price agreement receiver 302, a price change receiver 304, a hyperedge warning prompter 306, a constraint region graph display 308, and a data bus 310. The user interface 106 provides an interface for the system 100 to interact with a user.

The fixed price agreement receiver 302, in one embodiment, receives information about a fixed price agreement for a component or group of components in a transaction. The fixed price agreement receiver 302 receives fixed price information from a user. For example, the fixed price agreement receiver 302 may receive an input from a user indicating that the total cost of a group of components in the transaction should remain at a particular fixed price. In some embodiments, the user interface 106 transmits the information about the fixed price agreement to the price manager 102.

In one embodiment, the price change receiver 304 receives information from a user indicating a change in price for a component or group of components in the transaction. The user interface 106 may transmit the change in price to the price manager 102. For example, a user may indicate via the price change receiver 304 that the price of a particular component should be changed. The user interface 106 may transmit this price change to the price manager 102.

The hyperedge warning prompter 306, in one embodiment, generates a prompt in response to creation of a fixed price constraint that introduces a hyperedge into an existing transaction. The prompt indicates to the user than a fixed price constraint entered into the fixed price agreement receiver 302 would introduce a complication into the pricing of components of the system. In some embodiments, the hyperedge warning prompter 306 requires an input from the user to confirm the proposed fixed price constraint that creates a hyperedge.

In one embodiment, the constraint region graph display 308 generates a graphical representation of the constraint region graph generated by the constraint region graph generator 204. The graphical representation of the constraint region graph is presented to the user, for example, on a video display monitor (not shown).

The data bus 310 provides a communication pathway within the user interface 106 for various elements of the user interface 106. The data bus 310 may be any type of data communication system, including, but not limited to, a hardware bus, a wired connection, a network, a mesh system, and a wireless communication system. In some embodiments, the data bus 310 may include a combination of types of data communication system.

Figure 4:
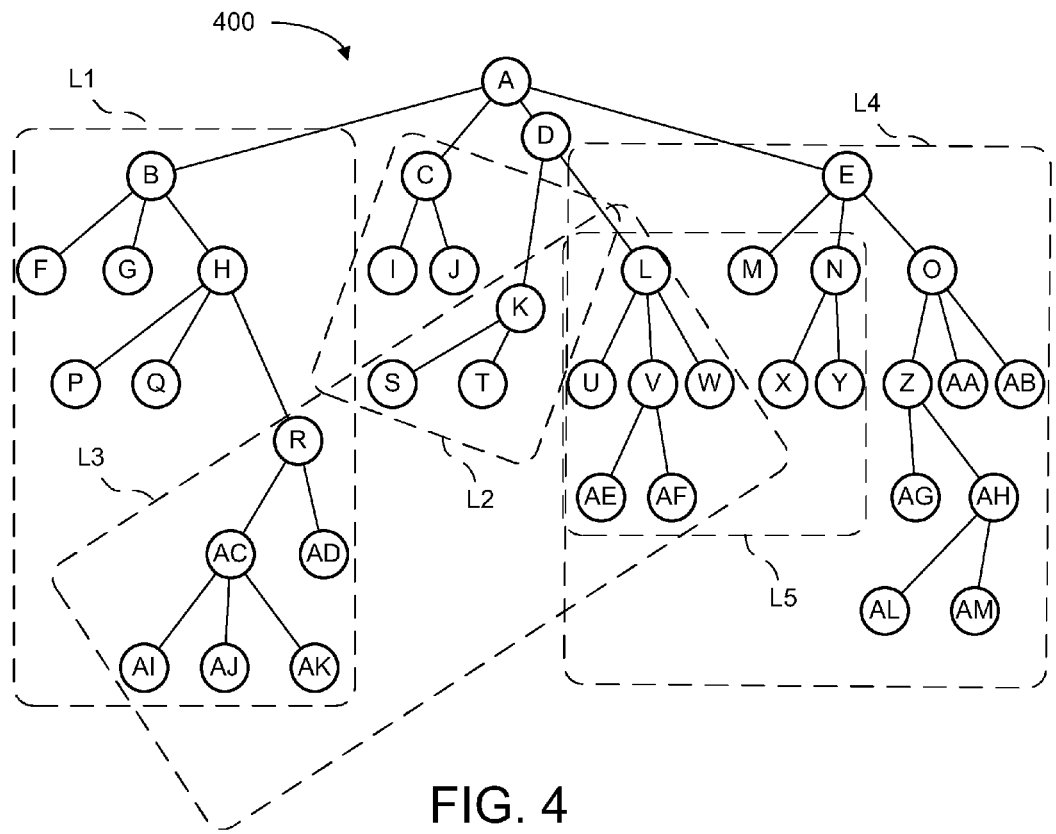
FIG. 4 depicts one example of a transaction including individual, hierarchically organized components subject to fixed price restrictions.

FIG. 4 depicts one example of a transaction 400 including individual, hierarchically organized components subject to fixed price restrictions. In the transaction 400, nodes representing components are indicated by circles labeled with letters A-AM, hierarchical relationships between components are indicated by lines between the components, and regions subject to price restrictions are indicated by dashed boxes L1-L5.

In the example transaction of FIG. 4, price changes within any of the regions subject to price restrictions ("frozen regions") are propagated such that each freeze constraint is maintained. For example, if the price of node K is changed, the prices of other nodes in regions L2 and L3 are changed accordingly. These changes may in turn affect the prices of other nodes in regions L1, L4, and L5.

When the price of a component within a frozen region is changed, there may be infinitely many ways to redistribute the price in order to satisfy the freeze constraint; however, the best solution will redistribute the price in such a way as to minimize the magnitude of individual changes to other components. Thus, in one embodiment, the price manager 102 minimizes the squared residual of price changes, or the least-squares solution for re-pricing all components within frozen regions affected by a price change.

In one embodiment, the solution is formulated by the linear equation solver 210 as:

Minimize $\|Cx-C\|^2$ subject to $Ax=b$, $\forall x_i \epsilon x, x_i \geq 0$, where C is a diagonal matrix containing the current price of each affected deal component, x is a vector of price deltas to be determined, Ax=b is a system of linear equations that represent the price freeze conditions, in the form of $C_i^* x_i + C_j^* x_j + \ldots = b_i$, and b is a vector representing the total cost of each frozen region. The matrix A contains a number of rows equal to the number of freeze constraints in the system to be solved, and the vector b contains the same number of elements.

Least squares is a convex function and therefore the solution can be efficiently computed using various techniques. In one embodiment, a standard least squares problem is augmented with the needed constraints by deriving a Lagrange dual function. The Lagrange multipliers are solved in the dual space using the infeasible-start Newton method to find the global maximum of the concave dual function, from which the primal solution vector is recovered. In some embodiments, more specialized known techniques for solving a least squares problem are used to reduce the dimensionality of the problem and provide more efficient solutions.

Converting systems of price locks in a transaction into the mathematical optimization problem described above is a non-trivial proposition. In some embodiments, a method for managing price lock information is employed that introduces a data structure for maintaining the lock state of transaction components and algorithms that enables the dynamic transformation of price change requests made by users into mathematical optimization problems with known solution techniques. The method also includes decision support features that enable users to make informed price locking choices that will affect the performance of automatic price redistribution.

Figure 5:
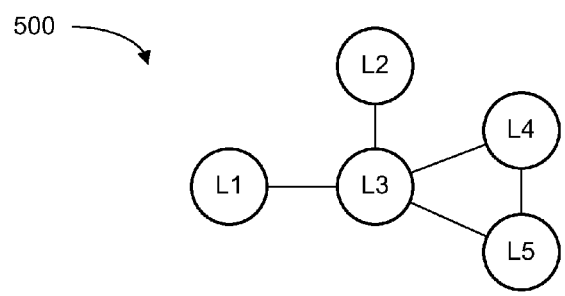
FIG. 5 depicts a graphical representation of the overlapping frozen regions of FIG. 4.

FIG. 5 depicts a graphical representation 500 of the overlapping frozen regions L1-L5 of FIG. 4. The freeze arrangement over the transaction component tree of FIG. 4 is represented as a sparse graph 500 in the general case. Price adjustments within a frozen region may affect all nodes that are members of the connected graph component in which the user-modified component resides. From the example in FIG. 4, the graphical structure represented in FIG. 5 can be derived. In this example, an adjustment to any item in L5 can affect the price of nodes in any of the other freeze regions L1-L4.

In some embodiments, for any price change to a component that resides in a price freeze region L1-L5, the neighborhood of nodes that can be affected by the price change is determined dynamically. This can be done by a standard depth-first search of the freeze graph, starting at the freeze node in which the change originated. A set C of all components that reside within the discovered network neighborhood is constructed by the affected component identifier 208, representing all the components that can be affected by the price change. For a set C of size N, an N×N diagonal matrix is constructed with the price of all nodes represented on the diagonal. For a graph component with M freezes, an ancillary M×N matrix A is be constructed where each row contains the price information of all nodes within an individual freeze and zero for all other index positions. An M-dimensional freeze price vector B contains the total price of each frozen region. These matrices and vectors are passed directly to one of the algorithms described above in order to find an N-dimensional solution vector X such that $\|C^*X-C\|^2$ is minimized while maintaining $A^*X=B$.

This direct approach will suffer severe performance problems when the size of an engagement is large, given that the optimization algorithm to be used will be polynomial time if taken from the best available choices. Engagement specifications with as many as 30,000 components are common in some service domains; therefore, the direct approach will have to optimize 30,000 variables in these cases, regardless of the complexity of the price lock arrangement.

Figure 6:
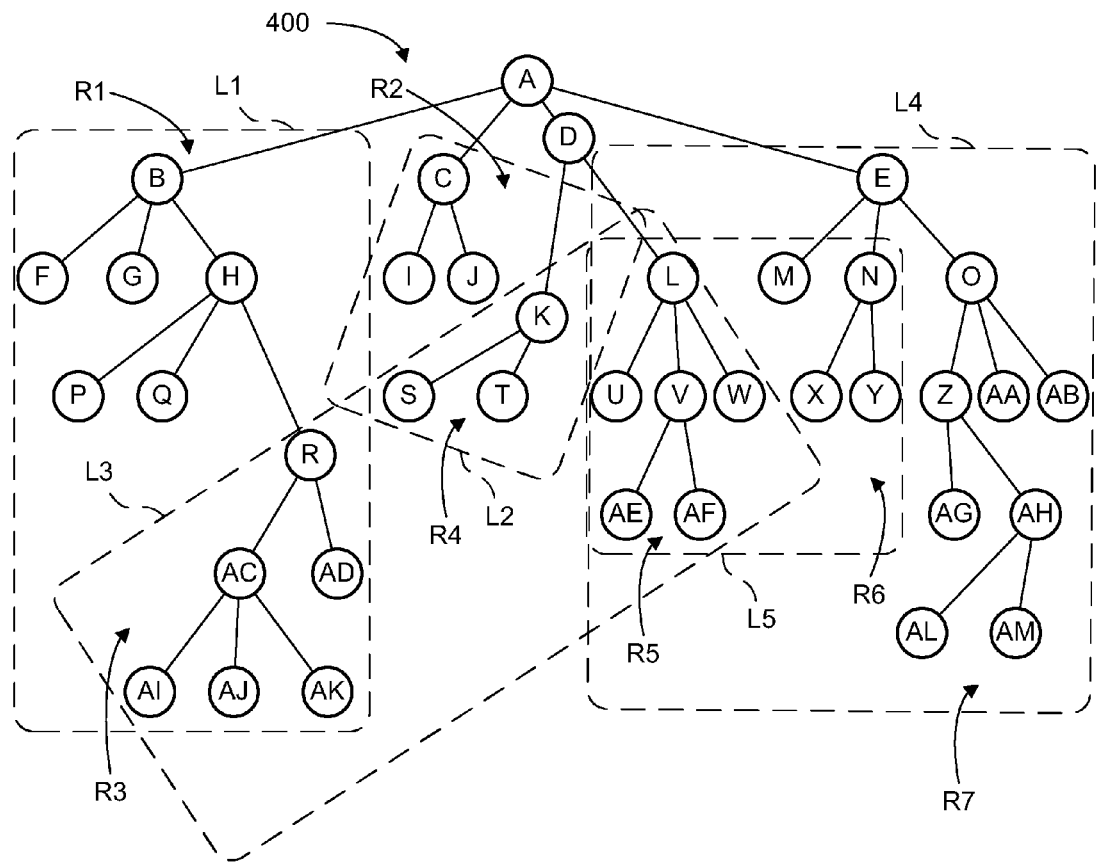
FIG. 6 depicts the example transaction of FIG. 4 with indicators for homogeneous regions in the transaction.
Figure 7:
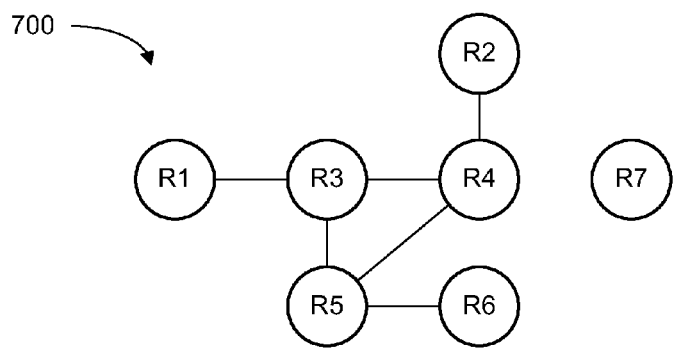
FIG. 7 depicts one embodiment of a constraint region graph of the homogeneous regions of the transaction and relationships between the regions.

To simplify the optimization procedure, the price manager 102 exploits an assumption that the price propagated to all nodes that are homogeneously frozen should be proportional to the original price of the nodes in a correct least squares solution. That is, the price change that is propagated to nodes that are part of the exact same set of frozen regions is linearly dependent on the original node prices. For this reason, the graphical representation of the frozen regions is simplified by constructing a constraint region graph such that each node represents a homogeneously frozen region and each edge represents a frozen price constraint. This graph is constructed such that regions are only connected within a graph component if it is possible to propagate price from one region to another FIG. 6 depicts the example transaction 400 of FIG. 4 with indicators for homogeneous regions R1-R7 in the transaction 400. FIG. 7 depicts one embodiment of a constraint region graph 700 of the homogeneous regions R1-R7 of the transaction 400 and relationships between the regions R1-R7. The simplified representation makes it possible for the price manager 102 to reduce the optimization problem to a polynomial time operation over the number of homogeneously frozen regions R1-R7 rather than over the individual components of the frozen regions L1-L5.

In one embodiment, once the total price change for each individual region is computed by the linear equation solver 210, the price change propagator 212 propagates price changes to individual components within the homogeneous regions R1-R7 in a proportional manner; that is, the price change for a component C in region R with total price change P is computed as $C_{price}/R_{price}*P$. In addition, the new representation opens the door to simple linear time solutions in specific cases, which are addressed below.

It may not be immediately intuitive from FIG. 7 why the region R7 is not connected to the main graph component. The reason is that it is impossible to propagate a price change from any node in R7 to any node in R6 or R5 without violating a freeze constraint. In the general case, there can be no propagation between regions $R_a$ and $R_b$ when $R_a$ is contained by a freeze region, $L_1=B_1$, that is a strict subset of a freeze that contains both $R_a$ and $R_b$, $L_2=B_2$. When this situation occurs, the system has the following constraints:

$$R_a+(L_1-R_a)=B_1$$

$$R_a+(L_1-R_a)+R_b+(L_2-R_a-R_b)=B_2$$

For simplicity, let $$(L_1-R_a)=R_{L1}$$

$$L_2-R_a-R_b=R_{L2}$$

As a result:

$$R_a+R_{L1}=B_1$$

$$R_a+R_{L1}+R_b+R_{L2}=B_2$$

Therefore:

$$R_b+R_{L2}+B_1=B$$

Thus, a change in $R_b$ can only affect $R_{L2}$ since $B_1$ and $B_2$ are constants, and vice-versa. Likewise, a change in $R_a$ can only affect $R_{L1}$ and vice versa.

The simplification makes it clear that unary and binary constraints (freezes comprised of only one or two homogeneously frozen regions) are quite easy to deal with. In the case of binary freeze constraints, if a change occurs in one region, an inverse change is propagated to all regions that are in a binary constraint with that region. In effect, there is only one solution in these cases. In the case of only binary constraints in a system of freezes, price delta propagation is therefore conducted as a simple linear-time procedure with a single solution (or no solution). Only cases that involve n-ary constraints where n>2 (represented as hyperedges in the constraint region graph 700) require search for optimal solutions using a constrained least squares algorithm.

It should be noted that there might still be infinitely many ways in which to propagate a price change even in a system made up only of binary constraints. This situation occurs whenever a price change is made to a component that resides within a region that is part of one or more binary constraints (i.e., one or more edges connect the region in which the changed component resides to other regions in the regional graph).

To understand this, it should be seen that the individual component changed by the user must be treated as a separate region within the constraint region graph 700, connected by a single edge not only to the region in which it resides, but also to all other regions that are connected to the home region. In effect, this creates a hyperedge that requires an optimal solution decision. In the case of a single initial hyperedge, a linear-time solution still exists for computing a price propagation that conforms to the least squares solution. The linear-time algorithm (described in detail below) can be extended to constraint systems in which multiple hyperedges are present.

For large engagements involving thousands of components, users may find it desirable to limit the complexity of the freeze constraint systems that they develop in order to maximize the performance of price change operations. In order to support users who wish to limit systems of freeze constraints to those which can be satisfied by embodiments of the linear-time price propagation technique, in some embodiments the hyperedge warning prompter 306 automatically notifies the user through a pop-up dialog or warning icon whenever a freeze is created that introduces a hyperedge into an existing system of unary or binary constraints. If the new freeze is created, the price manager 102 resorts to a polynomial-time constrained least squares technique in order to correctly satisfy price propagation procedures.

Figure 8:
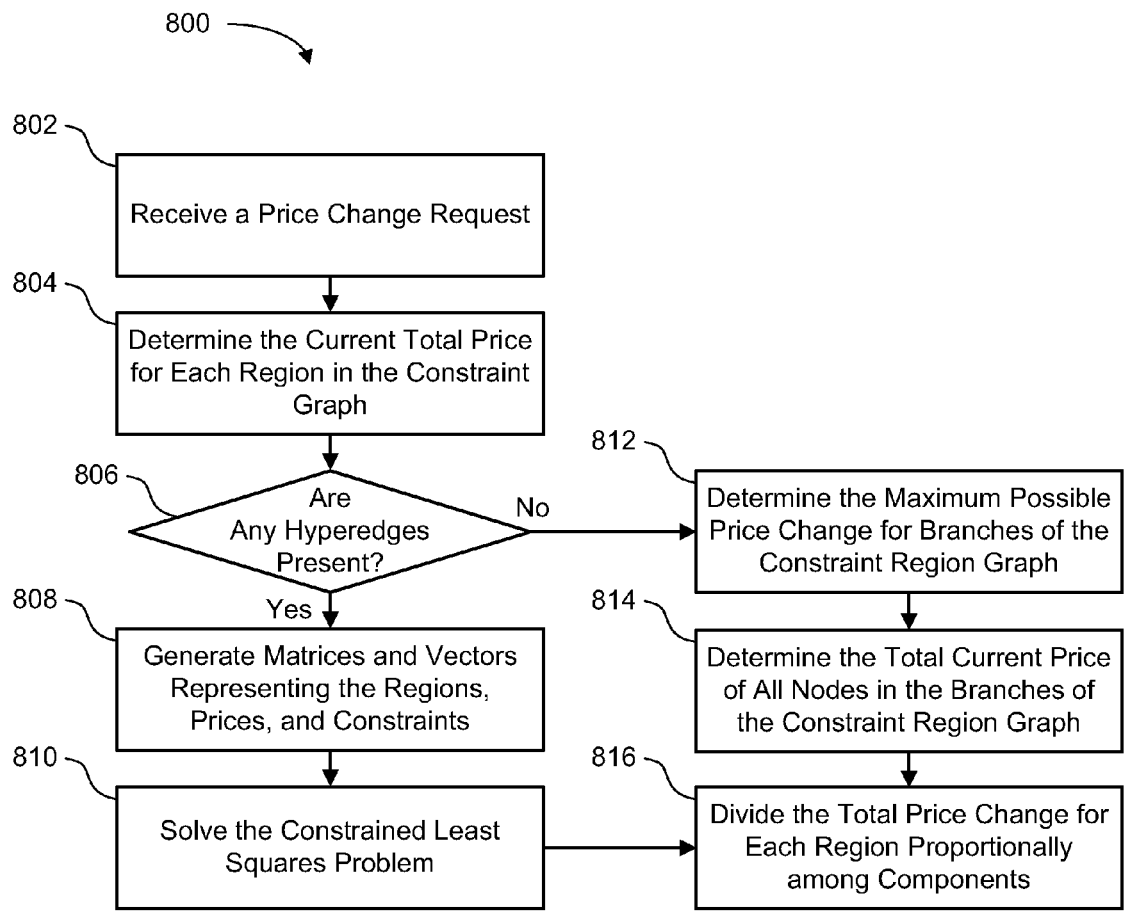
FIG. 8 is a flow chart diagram depicting one embodiment of a method for applying a price change to a transaction subject to price restrictions.

FIG. 8 is a flow chart diagram depicting one embodiment of a method 800 for applying a price change to a transaction subject to price restrictions. In the method 800, the price change receiver 206 receives 802 a price change request. The price manager 102 then determines 804 the current total price for each region in the constraint region graph 700. In some embodiments, determining 804 the total price for each region in the constraint region graph 700 includes performing a depth-first search of the constraint region graph starting from the region in which the price change was requested.

The price manager 102 determines 806 if there are any hyperedges present in the affected regions of the constraint region graph 700. In some embodiments, this determination 806 is performed during the depth-first search associated with determining 804 the current total price for regions.

If the price manager 102 determines 806 that there is at least one hyperedge, the linear equation solver 210 generates matrices and vectors representative of the regions, prices and constraints. In one embodiment, the linear equation solver 210 generates 808 the following matrices and vectors:

C: an N×N diagonal matrix, indexed according to region, which contains the price of each region on the diagonal. N is the number of regions.

A: an M×N matrix, indexed according to region, where each of the M rows represents a constraint. The nth column will contain the price of the nth region if that region participates in the constraint, zero otherwise.

B: an M-dimensional vector containing the total price required for each constraint.

D: an N-dimensional vector containing values equal to the corresponding diagonal of C.

The vectors and matrices are used by the linear equation solver 210 to solve 810 the constrained least squares problem, such that a solution vector X is obtained that minimizes the residual squared error of C*X=D while maintaining A*X=B and X>=0.

If the price manager 102 determines 806 that there are no hyperedges, the price manager 102 determines 812 the maximum possible price change for branches of the constraint region graph 700. In one embodiment, the price manager 102 performs a depth-first search of the constraint region graph 700, starting from the region associated with the price change. If it is necessary to find the maximum amount of price that can be propagated to a region (if adding to the region), the maximum is determined 812 as the minimum price of each of the regions neighborhoods. If it is necessary to find the maximum amount of price that can be taken from the region, the maximum is determined 812 as the total price of the region.

In one embodiment, each region is marked with the maximum price change in the forward search direction, alternating the calculation of maximum price that can be added to and maximum price that can be taken from the node on each successive deepening. If a node has been seen before, a loop has been encountered. In this case, if the sign of the price change for the marked node differs from the sign of the price change to be applied from the previous node, a price change is assigned to the previous node that corresponds to the minimum absolute value of the price change to be applied to each node. If the sign is the same, the price change of the previous node is set to zero.

The price manager 102 determines 814 the total current price of all nodes in the branches of the constraint region graph 700. In one embodiment, the sum of the total price of each node in a branch is passed back towards the root node of the search in the reverse of the search direction associated with the previous determining 812 step. The maximum price change of each node is reassigned to be the reverse of the maximum price change of the child deal that has the least absolute value price change. The search is continued until complete in both forward and backwards directions. Upon completion, each branch of the search tree is marked with 1) the determined 812 maximum magnitude of the price change that can be applied to the branch, and 2) the determined 814 total price of all nodes within the branch.

The lock management system is capable of solving the price propagation problem in linear-time when a region graph consists of only binary or unary constraints. In this case, determining steps 812 and 814 are employed to obtain a solution that mirrors the least squares solution without relying on more complex, polynomial-time methods.

Determining steps 812 and 814 make it possible to 1) find the bounds of the price change that can be handled by a given region in order to determine the feasibility of propagating a price change, and 2) assign price change proportionally to each branch of the search tree based on the total price of the branch in order to arrive at a solution that mirrors the least-squares solution of the propagation problem. It is important to reiterate that this procedure only applies to constraint region graphs that are made up binary or unary constraints. When applying this technique, a decision for proportional price assignment is only required for propagating price to branches that spawn from the original hyperedge generated by a user price change. Once a decision is made at the origin, price propagation occurs in a deterministic fashion to satisfy the binary constraints within each branch.

The total price change for each region is proportionally divided 816 among components with each region of the constraint region graph 700. The price change divided 816 among components may be calculated using steps 808 and 810 if the change is subject to a hyperedge, or by steps 812 and 814 if the change is not subject to a hyperedge.

The price manager 102 generates as a data structure for properly maintaining the constraint region graph 700 in order to efficiently transform the lock state of the system into a well-defined problem with an efficient solution method. The price manager 102, in some embodiments, supports the operations described below.

Freeze(freeze_id, components). If components are part of prior regions, create new regions for each new homogeneous region, and move each component from its old region to its new one. If old regions become empty, remove them from the region graph. Link each new region to each region from which components were taken to form the new region. Create a hyperlink among all newly created regions that are not regularly locked and are not part of a separate freeze made up of a set of components that are a strict subset of the newly frozen components. If the newly added freeze results in a hyperedge within a graph component that previously contained no hyperedge, alert the user that a less efficient strategy will be required for future price change operations.

Lock(lock_id, components). If components are part of prior regions, create new regions for each new homogeneous region, mark the new regions as locked, and move each component from its old region to its new one. If old regions become empty, remove them from the region graph.

Unfreeze(freeze_id). If a component is locked by the specified freeze and not by any other regular lock or freeze, remove the component from its region. If the region becomes empty, remove the region from the region graph. If a component is part of a separate regular lock or freeze, remove the component from its previous region and add it to a region that represents all freezes and regular locks that applied to the component other than the one that is being removed. If the previous region becomes empty, remove it from the region graph.

Unlock(lock_id). If a component is locked by the specified regular lock and not by any other regular lock or freeze, remove the component from its region. If the region becomes empty, remove the region from the region graph. If a component is part of a separate regular lock or freeze, remove the component from its previous region and add it to a region that represents all freezes and regular locks that applied to the component other than the one that is being removed. If the previous region becomes empty, remove it from the region graph. If the previous region was marked as locked, but the newly assigned region is not, create links between the newly assigned region and all other regions that share the same freeze IDs as the newly assigned region.

It should also be noted that at least some of the operations for the methods may be implemented using software instructions stored on a computer useable storage medium for execution by a computer. As an example, an embodiment of a computer program product for managing price information for components of a transaction proposal includes a computer useable storage medium to store a computer readable program that, when executed on a computer, causes the computer to perform operations, including receiving a mapping of interconnected components, identifying as a first subset components subject to a first fixed price agreement not subject to a second fixed price agreement that overlaps the first fixed price agreement, identifying as a second subset the components subject to the second fixed price agreement not subject to the first fixed price agreement, and identifying as a third subset the components subject to both the first fixed price agreement and the second fixed price agreement. Each component represents a portion of a transaction proposal and includes an assignable associated price. The method also includes receiving a price change for a price associated with a component in one of the subsets of components, and distributing an offset of the price change to components in the other subsets of components. A total price associated with the first subset is the sum of prices associated with the first subset of components. A total price associated with the second subset is the sum of prices associated with the second subset of components. A total price associated with the third subset is the sum of prices associated with the third subset of components. The price of each fixed price agreement does not change and the total price of each subset of components is greater than or equal to zero. Component price changes within a subset are linearly dependent upon the original associated price of the components.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for managing price information comprising:
receiving, by a processor, a mapping of interconnected components, wherein:
each component represents a portion of a transaction proposal and comprises an assignable associated price;
a first group of components from the mapping are subject to a first fixed price agreement;
a second group of components from the mapping are subject to a second fixed price agreement; and
the first group of components overlaps the second group of components;
identifying, by a processor, as a first subset the components in the first fixed price agreement not in the second fixed price agreement, wherein a total price associated with the first subset is the sum of prices associated with the first subset of components;
identifying, by a processor, as a second subset the components in the second fixed price agreement not in the first fixed price agreement, wherein a total price associated with the second subset is the sum of prices associated with the second subset of components;
identifying, by a processor, as a third subset the components in both the first fixed price agreement and the second fixed price agreement, wherein a total price associated with the third subset is the sum of prices associated with the third subset of components;
receiving, by a processor, a price change for a price associated with a component in one of the subsets of components; and
distributing, by a processor, an offset of the price change to components in the other subsets of components, wherein the price of each fixed price agreement does not change and the total price of each subset of components is greater than or equal to zero.

2. The computer-implemented method of claim 1, wherein component price changes within a subset are linearly dependent upon the original associated price of the components.

3. The computer-implemented method of claim 1, wherein distributing the offset of the price change comprises minimizing the price changes across all total prices.

4. The computer-implemented method of claim 3 wherein minimizing the price changes across all total prices comprises determining a least-squares solution for price change regarding the subsets of components.

5. The computer-implemented method of claim 1, further comprising converting a price change for a component in the mapping into a system of linear equations, and wherein the offset of the price change is derived from a solution to the system of linear equations.

6. The computer-implemented method of claim 1, further comprising identifying components affected by the price change.

7. The computer-implemented method of claim 6, further comprising generating a diagonal matrix comprising the prices associated with the components affected by the price change.

8. The computer-implemented method of claim 1, wherein the transaction is a service engagement.

9. A computer program product comprising a non-transitory computer-readable storage medium to store a computer readable program, wherein the computer readable program, when executed on a computer, causes the computer to perform operations for managing price information for components of a transaction proposal, the operations comprising:
receiving a mapping of interconnected components, wherein:
each component represents a portion of a transaction proposal and comprises an assignable associated price;

a first group of components from the mapping are subject to a first fixed price agreement;
a second group of components from the mapping are subject to a second fixed price agreement; and
the first group of components overlaps the second group of components;
identifying as a first subset the components in the first fixed price agreement not in the second fixed price agreement, wherein a total price associated with the first subset is the sum of prices associated with the first subset of components;
identifying as a second subset the components in the second fixed price agreement not in the first fixed price agreement, wherein a total price associated with the second subset is the sum of prices associated with the second subset of components;
identifying as a third subset the components in both the first fixed price agreement and the second fixed price agreement, wherein a total price associated with the third subset is the sum of prices associated with the third subset of components;
receiving a price change for a price associated with a component in one of the subsets of components; and
distributing an offset of the price change to components within the other subsets of components, wherein the price of each fixed price agreement does not change, the total price of each component in the subsets of components is greater than or equal to zero, and component price changes within a subset are linearly dependent upon the original associated price of the components.

10. The computer program product of claim 9, further comprising generating a constraint region graph for the mapping, wherein the constraint region graph comprises one or more nodes and one or more edges, each node representing a homogeneously frozen region and each edge representing a frozen price constraint, and wherein the nodes are connected if a price change can be propagated from one connected node to another connected node.

11. The computer program product of claim 10, further comprising generating a display representation of the constraint region graph.

12. The computer program product of claim 10, further comprising receiving an input indicating that a third group of components from the mapping are subject to a third fixed price agreement and generating a new constraint region graph including the third fixed price agreement.

13. The computer program product of claim 12, further comprising generating an alert in response to determining a component of the constraint region graph for the mapping has no hyperedges, and that the component includes a hyperedge in the new constraint region graph.

14. The computer program product of claim 10, further comprising determining a maximum price change that can be propagated to a region.

15. The computer program product of claim 14, wherein if a propagated change comprises adding a price to the region, determining the maximum price change comprises:
performing a depth first search of the constraint region graph, starting from the region;
calculating a minimum price for a each of the regions in a neighborhood of the region.

16. The computer program product of claim 14, wherein if a propagated change comprises subtracting a price from the region, determining the maximum price change comprises:
performing a depth first search of the constraint region graph, starting from the region;
calculating the total price of the region.

17. The computer program product of claim 14, further comprising:
determining a maximum price change for a next deeper region in the constraint region graph until no deeper regions exist;
assigning the lowest maximum price change from the regions as the maximum price change within the branch of the constraint region graph defined by the region and all regions below the region; and
determining the total price of components in the branch of the constraint region graph.

18. A system comprising:
a processor;
a price database stored on a memory configured to store prices associated with components of a service engagement, wherein:
the price database comprises a mapping of interconnecting components;
each component represents a portion of a transaction proposal and comprises an assignable associated price;
a first group of components from the mapping is subject to a first fixed price agreement;
a second group of components from the mapping is subject to a second fixed price agreement; and
the first group of components overlaps the second group of components;
a price manager to be executed by the processor to:
identify as a first subset the components in the first fixed price agreement not in the second fixed price agreement, wherein a total price associated with the first subset is the sum of prices associated with the first subset of components;
identify as a second subset the components in the second fixed price agreement not in the first fixed price agreement, wherein a total price associated with the second subset is the sum of prices associated with the second subset of components;
identify as a third subset the components in both the first fixed price agreement and the second fixed price agreement, wherein a total price associated with the third subset is the sum of prices associated with the third subset of components;
receive a price change for a price associated with a component in one of the subsets of components; and
distribute an offset of the price change to components within the other subsets of components, wherein the price of each fixed price agreement does not change, the total price of each component in the subsets of components is greater than or equal to zero, and component price changes within a subset are linearly dependent upon the original associated price of the components; and a user interface configured to generate a constraint region graph for the mapping, wherein the constraint region graph comprises one or more nodes and one or more edges, each node representing a homogeneously frozen region and each edge representing a frozen price constraint, and wherein the nodes are connected if a price change can be propagated from one connected node to another connected node.

19. The system of claim 18, wherein distributing the offset of the price change comprises determining a least-squares solution for price change regarding the subsets of components.

20. The system of claim 18, further comprising converting a price change for a component in the mapping into a system of linear equations, and wherein the offset of the price change is derived from a solution to the system of linear equations.

* * * * *